US007952607B2

(12) United States Patent
Baker

(10) Patent No.: US 7,952,607 B2
(45) Date of Patent: May 31, 2011

(54) METHOD AND APPARATUS FOR EFFICIENT PRESENTATION OF CONTENT OVER A NETWORK TO A VISUALLY IMPAIRED USER

(75) Inventor: Albert J. Baker, Eatontown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1184 days.

(21) Appl. No.: 11/414,517

(22) Filed: Apr. 28, 2006

(65) Prior Publication Data
US 2007/0255569 A1 Nov. 1, 2007

(51) Int. Cl.
*H04N 7/18* (2006.01)
*H04N 9/47* (2006.01)
(52) U.S. Cl. ......................................................... 348/62
(58) Field of Classification Search .............. 348/61–63; 704/270.1, 271
See application file for complete search history.

(56) References Cited

U.S. PATENT DOCUMENTS

| | | | | |
|---|---|---|---|---|
| 7,246,041 | B2 * | 7/2007 | Fukuda et al. | 702/189 |
| 7,272,785 | B2 * | 9/2007 | Fukuda et al. | 715/234 |
| 7,336,256 | B2 * | 2/2008 | Parzygnat et al. | 345/156 |
| 2005/0034063 | A1 * | 2/2005 | Baker et al. | 715/513 |
| 2007/0061486 | A1 * | 3/2007 | Trinh et al. | 709/246 |

OTHER PUBLICATIONS

Section 508: http://www.section508.gov, downloaded Mar. 28, 2006.
HTML 4.01 Specification: http://www.w3/prg/TR/REC-html140/, downloaded Mar. 28, 2006.
Resource Description Framework (RDF: http://www.w3.org/RDF/, downloaded Mar. 28, 2006; and.
Web Accessibility Initiative (WAI): http://www.w3.org/WAI/, downloaded Mar. 28, 2006.

* cited by examiner

*Primary Examiner* — Gevell Selby
(74) *Attorney, Agent, or Firm* — Joseph B. Ryan; Jason Paul DeMont; Wayne S. Breyer

(57) ABSTRACT

Methods and apparatus are provided for efficient presentation of content over a network to a visually impaired user. Requests for content from a visually impaired user are processed by observing behavior of the user in connection with the requests; determining if the observed behavior constitutes a behavior pattern; and generating one or more rules based on the observed behavior that dynamically restructure content presented on at least one web page such that previously selected portions of the content is presented to the visually impaired user prior to other portions of the content. If one or more rules associated with a visually impaired user are applicable to requested content, wherein the rules are based on previously observed behavior of the user; and the requested content is restructured based on the one or more applicable rules such that previously selected portions of the content is presented to the visually impaired user prior to other portions of the content.

21 Claims, 6 Drawing Sheets

METHOD AND APPARATUS FOR EFFICIENT PRESENTATION OF CONTENT OVER A NETWORK TO A VISUALLY IMPAIRED USER

FIELD OF THE INVENTION

The present invention relates generally to techniques for accessing information over a network, such as the Internet, and more particularly, to techniques for improving the presentation of content to visually impaired users.

BACKGROUND OF THE INVENTION

A user having an Internet connection and a browser, such as Microsoft Internet Explorer™, can access almost any type of desired information on the Internet or World Wide Web (WWW). A number of search tools, such as Google, are available to help users locate information of interest. While the Internet provides a valuable resource to most users, the experience can be very frustrating for visually impaired users.

Screen readers are available that read out the text of a web page to the user in a linear fashion. A web page, however, is often not designed to be easily displayed and used by both a web page for visual users, and people using a screen reader. A visually impaired often has to repeatedly listen to the same parts of a web page or the same flows of a website, making them very less productive than a visual user.

A number of techniques have been proposed or suggested for improving the browsing experience for visually impaired users. The Hypertext Markup Language (HTML 4.0) specification, for example, includes a number of techniques that can be employed by web page developers to better accommodate screen readers. For example, a "skip to content" link allows a visually impaired user to proceed directly to the page content, and thereby avoid hearing the same menu repeatedly as the user browses through multiple pages. The user must memorize the menu structures, and can often get lost, or have to go back and re-listen to the links to find what the user is looking for.

Where a visual user reads a web page from top to bottom and left to right and makes correlations visually, a visually impaired user must listen to a page in a linear form. For example, a label and an associated button on a web page can be easily correlated together for visual users. For the screen reader, however, a number of HTML tags and attributes must be used to associate the label and button together, so the screen reader can read the correct label for the associated elements.

A need exists for methods and apparatus for improving the presentation of content to visually impaired users. A further need exists for techniques for predicting the behavior of a visually impaired user on a web page and presenting the user with the content that is most likely of interest.

SUMMARY OF THE INVENTION

Generally, methods and apparatus are provided for efficient presentation of content over a network to a visually impaired user. According to one aspect of the invention, one or more requests from a visually impaired user are processed for a visually impaired user by observing behavior of the user in connection with the requests; determining if the observed behavior constitutes a behavior pattern; and generating one or more rules based on the observed behavior that dynamically restructure content presented on at least one web page such that previously selected portions of the content is presented to the visually impaired user prior to other portions of the content.

The rules are based, for example, on one or more of a context of the requests, the behavior of the user, and system metadata. The rules comprise one or more conditions for triggering the rule and a corresponding action that defines how the content is presented to the user. The rules can, for example, (i) specify a web page flow for further links; and (ii) rank available content choices based on the observed behavior of the user. The context of the requests comprises one or more of an identity of the user, what the user is doing at a time of the request and what the user has been doing since starting a current browsing session. The observed behavior can comprise, for example, one or more of pages viewed by the user, pages skipped by the user, and a frequency and duration of each page access.

According to another aspect of the invention, a request for content from a visually impaired user is processed by determining if one or more rules associated with the visually impaired user are applicable to the requested content, wherein the rules are based on previously observed behavior of the user; and restructuring the requested content based on the one or more applicable rules such that previously selected portions of the content is presented to the visually impaired user prior to other portions of the content. The rules can rank available content choices based on the observed behavior of the user. The restructured content can optionally be transformed into Voice XML and applied to an IVR system.

A more complete understanding of the present invention, as well as further features and advantages of the present invention, will be obtained by reference to the following detailed description and drawings.

DETAILED DESCRIPTION

The present invention provides methods and apparatus for improving the presentation of content to visually impaired users. According to one aspect of the invention, a monitoring process 500, discussed further below in conjunction with FIG. 5, observes the browsing experience of one or more visually impaired users to detect one or more patterns of behavior. According to another aspect of the invention, a presentation process 600, discussed further below in conjunction with FIG. 6, presents content to users based on the detected patterns of behavior. In this manner, web content can be presented to the visually impaired user in a more efficient manner. The user can thus be presented with the content that is most likely of interest based on the observed patterns of behavior. For example, if a visually impaired user has previously visited a particular web page and selected a particular link (or menu option) from a list of available links (or available menu options), the previously selected link can be presented to the user at the top of the list of available links upon the next visit to the same web page. More generally, if a user often selects content associated with a given topic on one or more web pages, any content related to the given topic can be prioritized on subsequently visited web pages.

While the techniques of the present invention are illustrated herein in the context of a visually impaired user, the disclosed techniques may also be applied to improve the browsing experience for uses having other types of impairments. In addition, while the present invention is illustrated in the context of improving the ability to access web content, the present invention may also be applied in any text-to-speech environment. For example, the present invention can be used as a bridge between interactive voice response (IVR) systems and web systems. It is noted that a web application that has been restructured in accordance with the present invention is analogous to an IVR script. Rather than applying the restructured web page to a screen reader, the restructured web page can be transformed into Voice XML and applied into an IVR system.

Figure 1:
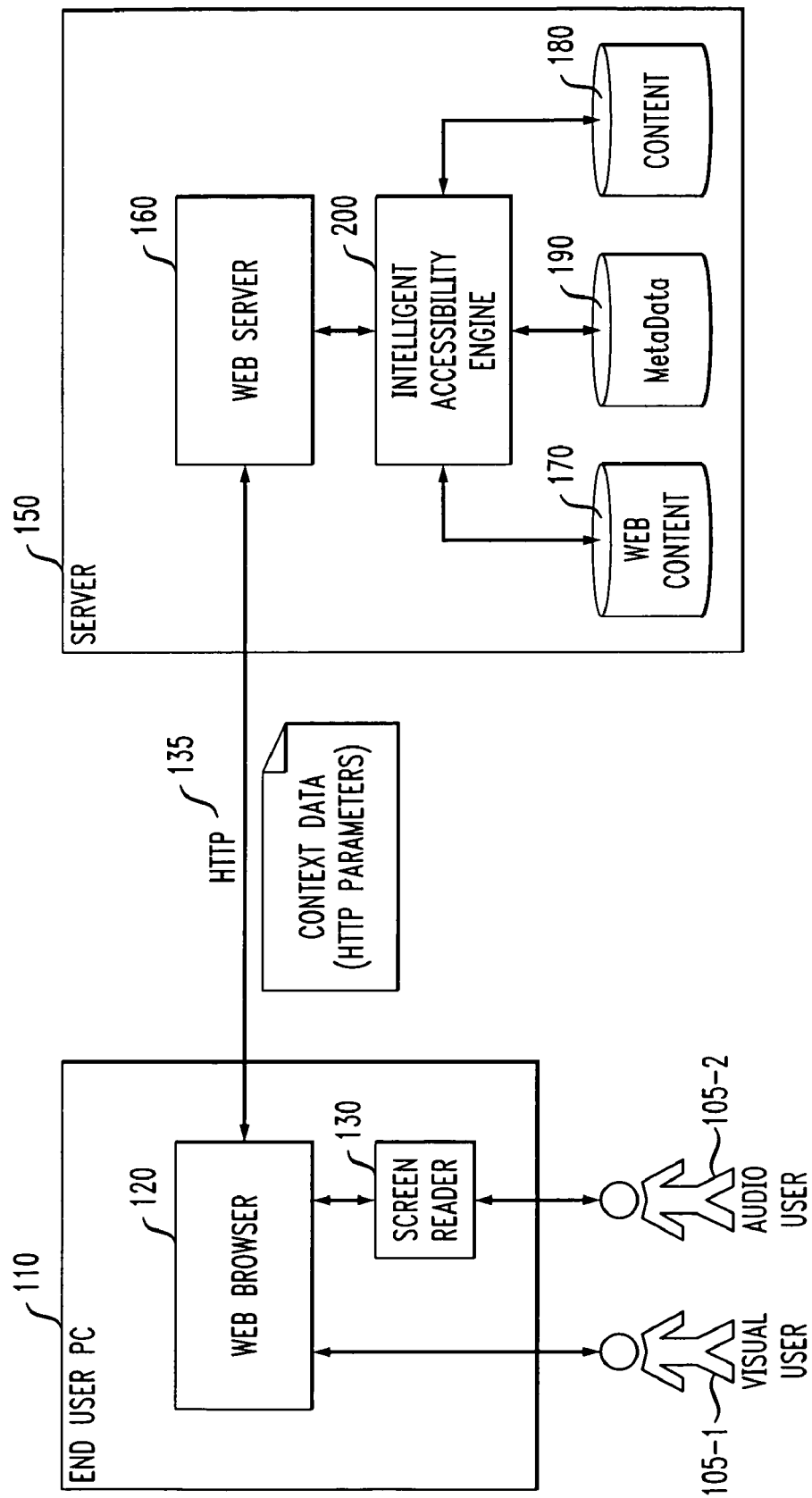
FIG. 1 illustrates a client-server environment in which the present invention can operate.

FIG. 1 illustrates a client-server environment in which the present invention can operate. As shown in FIG. 1, one or more users 105, employing a user computer device 110, use a browser 120 to access content over a network, such as the Internet. In the exemplary embodiment shown in FIG. 1, the desired content is provided by a server 150. The user computer device 110 may be a general purpose computing device, such as a personal computer or laptop. The server 150 may be embodied as any commercially available server, as modified herein to provide the features and functions of the present invention.

The browser 120 may be implemented by both visual users 105-1 and visually impaired users 105-2. When used by a visual user 105-1, the browser 120 may operate in a conventional manner. When used by a visually impaired user 105-2, the browser 120 may operate in accordance with the present invention, such that web content is presented to the user 105-2 in an efficient manner.

As shown in FIG. 1, the server 150 includes a web server 160 for processing the exemplary Hypertext Transfer Protocol (HTTP) requests 135 that are received from the user computer device 110, in a well-known manner. When the HTTP requests 135 are associated with a visually impaired user 105-2, the request is processed in accordance with the present invention. The HTTP requests 135 may be identified as being associated with a visually impaired user 105-2, for example, by setting a flag associated with the request 135, or based on a version identifier of the browser 120 that is included in the HTTP request 135. In this manner, the techniques of the present invention do not need to be embedded into standard web pages. Rather, the present invention can be activated as part of the request chain with the capability to intercept that request and serve the content back to itself. Thus, the present invention can be backwards compatible and can wrap existing web pages and web sites with the improved browsing capabilities for visually impaired users.

When the HTTP requests 135 are associated with a visually impaired user 105-2, the web server 160 interacts with an Intelligent Accessibility Engine (IAE) 200, discussed further below in conjunction with FIG. 2. Generally, the IAE 200 will employ a presentation process 600 to process the request 135 to deliver the requested content from a content database 170 based on context information associated with the content from a context database 180, and metadata associated with the content from a metadata database 190. The IAE 200 will employ a monitoring process 500 to observe the user behavior and identify patterns of behavior. In this manner, the IAE 200 collects user identity information, metadata information 190, and context information 180. The IAE 200 improves the browsing experience for a visually impaired user by retrieving and presenting the most useful content to the visually impaired user based on detected patterns of behavior.

Figure 2:
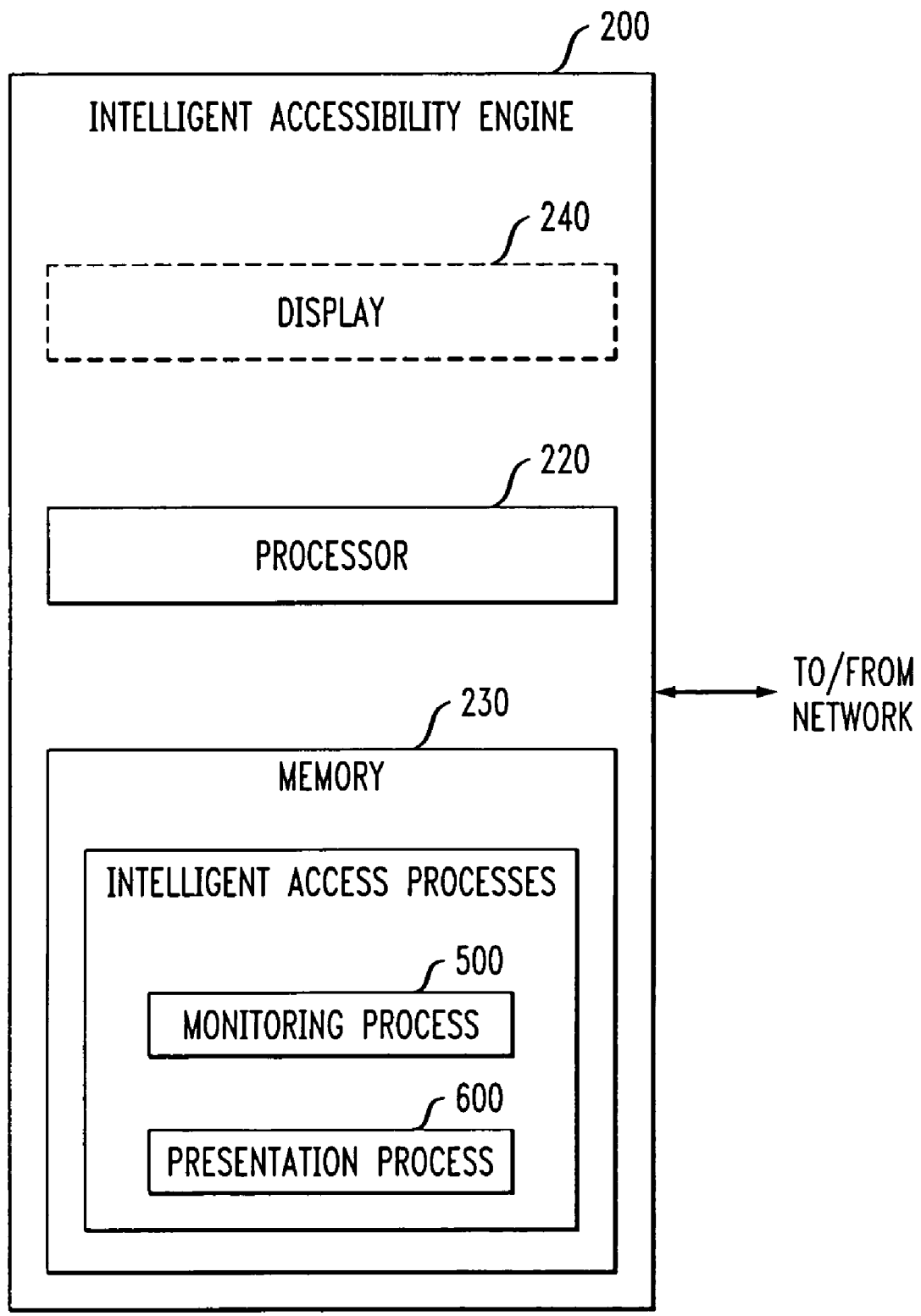
FIG. 2 is a block diagram of an intelligent accessibility engine (IAE) of FIG. 1 that can implement the processes of the present invention.

FIG. 2 is a block diagram of an IAE system 200 that can implement the processes of the present invention. As shown in FIG. 2, a memory 230 configures the processor 220 to implement the IAE methods, steps, and functions disclosed herein. For example, as shown in FIG. 2, the memory 230 stores the monitoring process 500 and presentation process 600 that incorporate features of the present invention. The memory 230 could be distributed or local and the processor 220 could be distributed or singular. The memory 230 could be implemented as an electrical, magnetic or optical memory, or any combination of these or other types of storage devices. It should be noted that each distributed processor that makes up processor 220 generally contains its own addressable memory space. It should also be noted that some or all of IAE system 200 can be incorporated into an application-specific or general-use integrated circuit.

Figure 3:
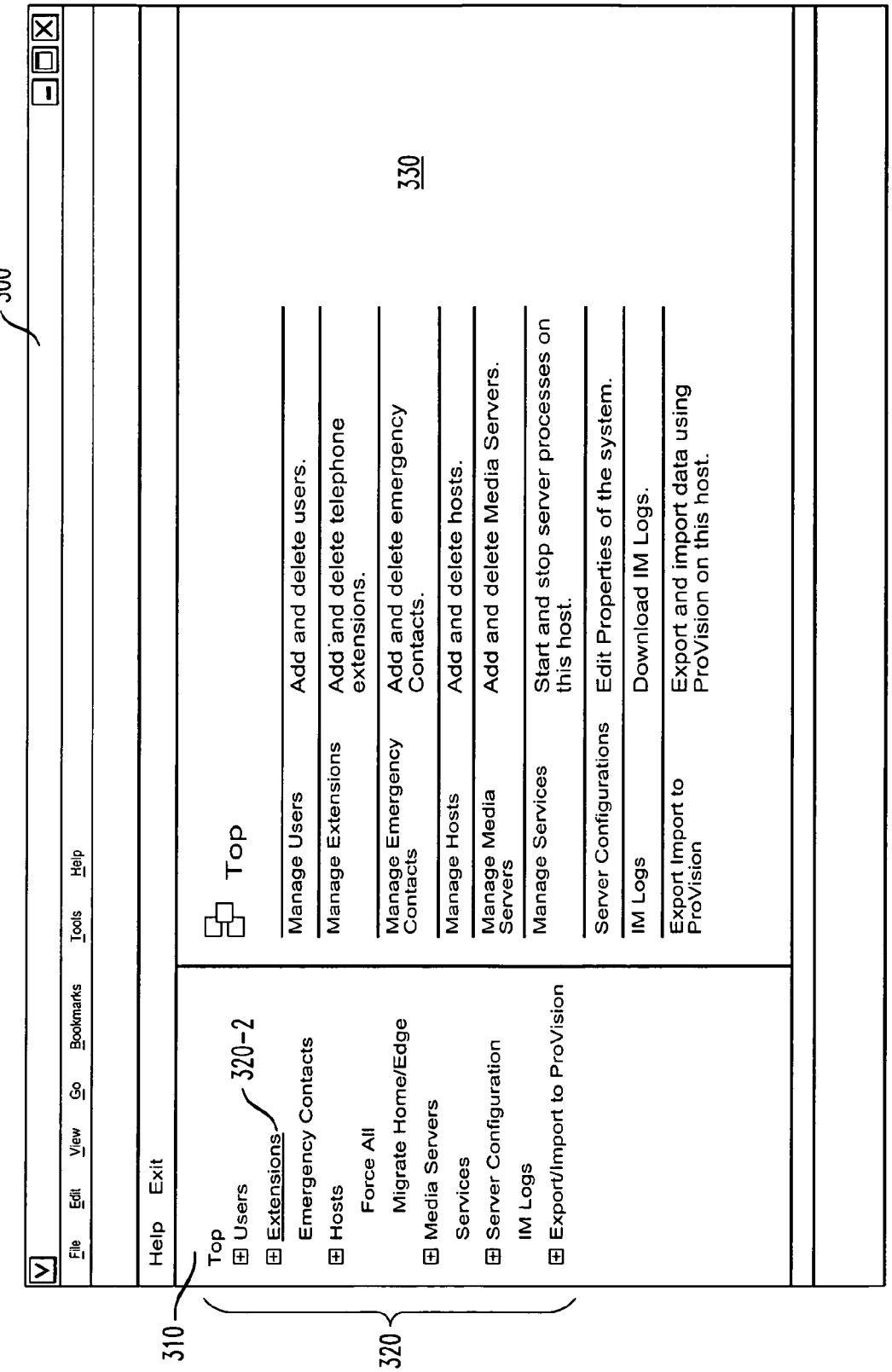
FIG. 3 is a screen shot illustrating an exemplary web page that is accessed by a user, for example, after logging into a particular service.

FIG. 3 is a screen shot illustrating an exemplary web page 300 that is accessed by a user 105, for example, after logging into a particular service. As shown in FIG. 3, the page 300 includes a window 310 having a plurality of available links 320-1 through 320-N. The content presented in a second window 330 is determined by the selected link 320. As presented in FIG. 3, the user 105 has not selected a link yet. Thus, a top menu is presented in window 330 that illustrates the various functions associated with each link. Meanwhile, the IAE 200 is observing the actions of the user 105 using the monitoring process 500, discussed below. Assume that the user selects the link 320-2, which causes the "extensions" link 320-2 to expand to identify additional options of "list," "add" and "search" extensions. Further assume that the user 105 selects the link 320 associated with "list extensions." This behavior is observed by the IAE 200 and recorded in a record associated with the particular user 105.

Figure 4:
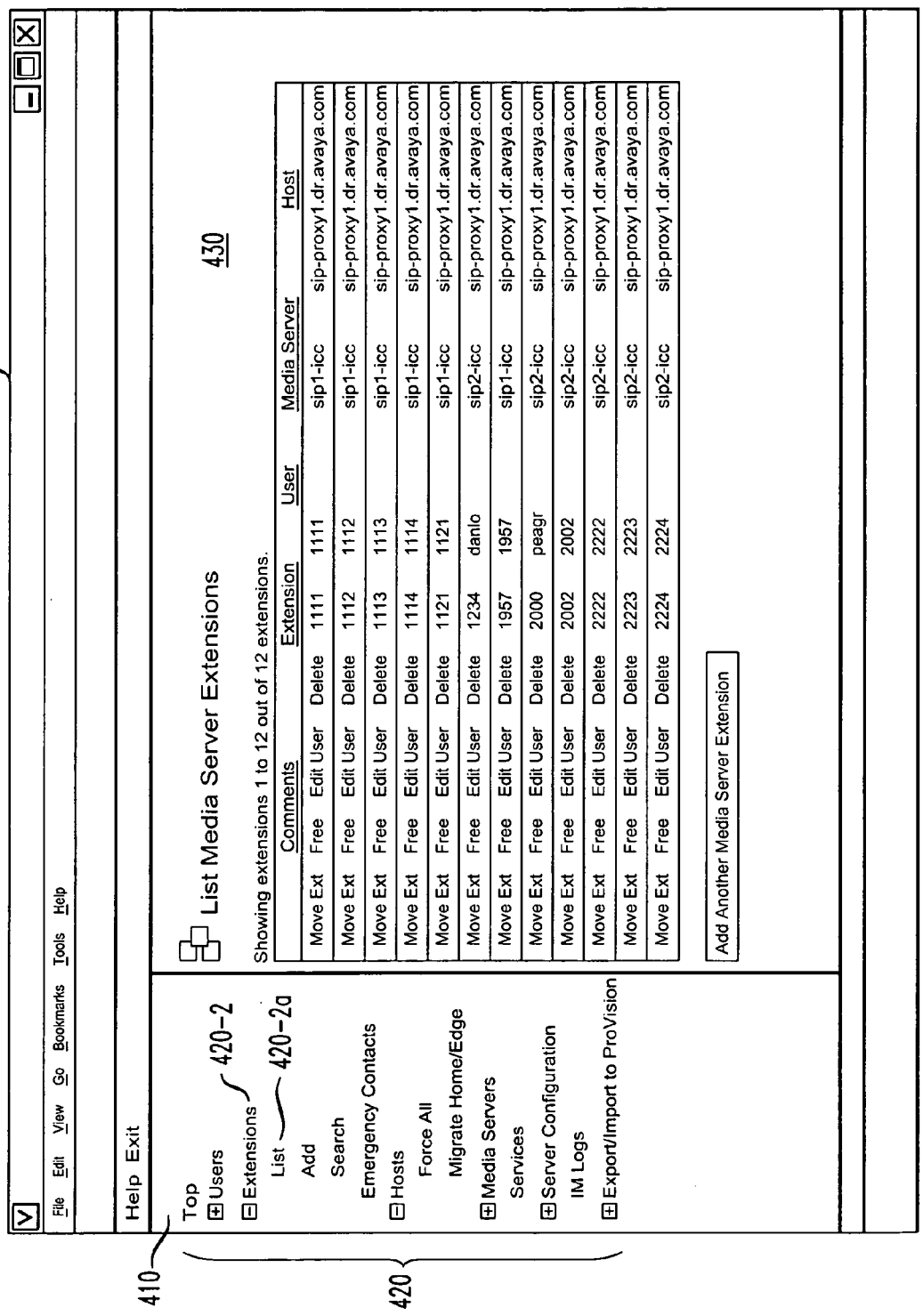
FIG. 4 is a screen shot illustrating the web page of FIG. 3 after dynamic restructuring in accordance with the present invention to present the user with the content that is most likely of interest.

FIG. 4 is a screen shot illustrating an exemplary web page 400 that is accessed by a user 105, for example, after logging into a particular service. The web page 400 is a page based on the web page 300 of FIG. 3 that has been restructured in accordance with the present invention based on the individual needs of a visually impaired user 105. The restructured web page 400 is directly presented to the visually impaired user 105 upon logging into the particular service. The placement of the content presented in the page 400 has been optimized such that the visually impaired user 105 is presented with the content that is most likely of interest (based on observed prior behavior). As discussed above in conjunction with FIG. 3, upon a previously observed log-in, the visually impaired user 105 selected the link 320 associated with "list extensions."

Thus, when the restructured web page 400 is presented to the visually impaired user 105, it has been pre-populated in accordance with the present invention with a selection of the link 420-2a associated with "list extensions." Thus, the content associated with the "list extensions" link 420-2a is automatically presented in the second window 430.

Figure 5:
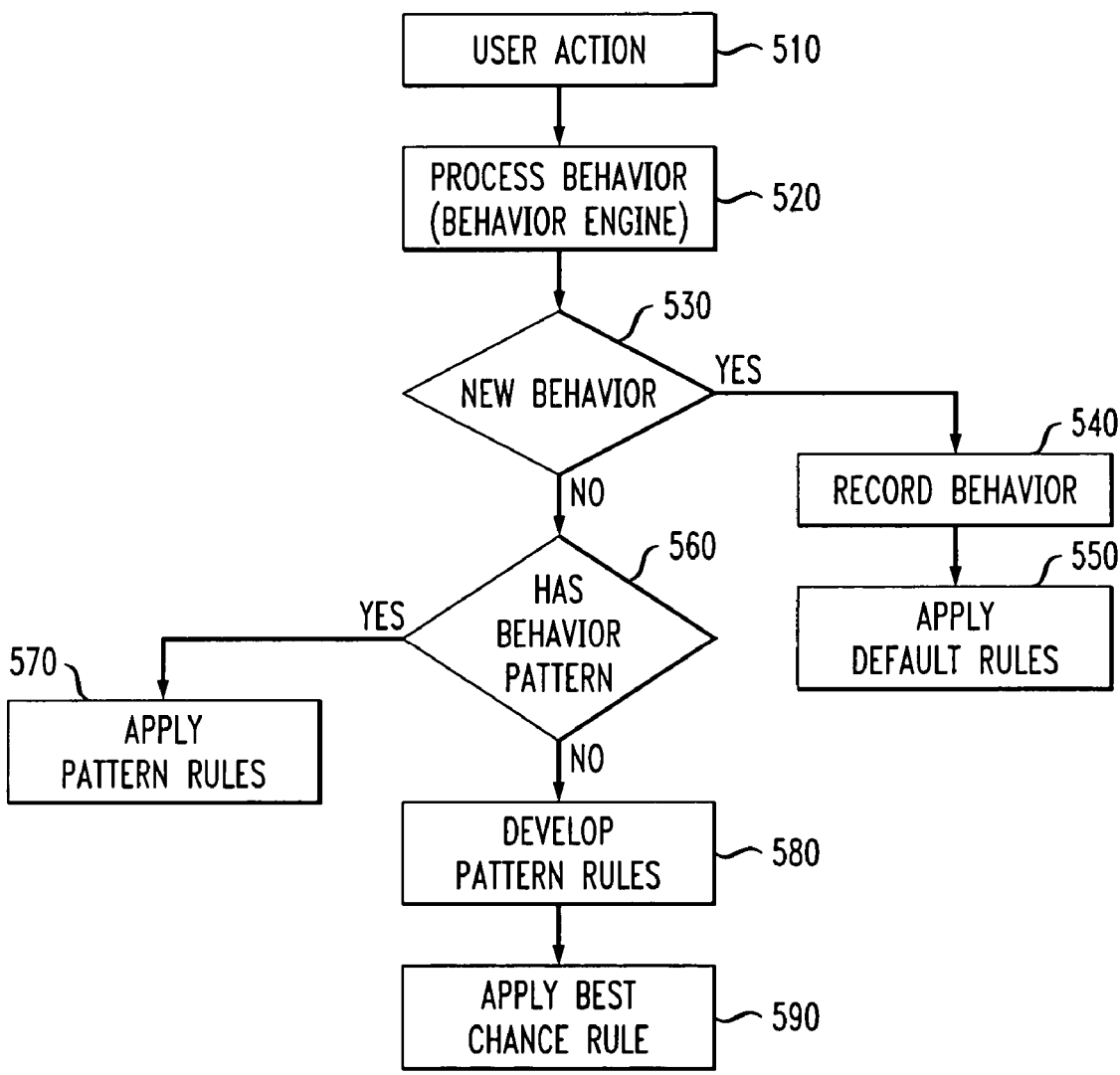
FIG. 5 is a flow chart describing an exemplary implementation of a monitoring process that observes the browsing experience of one or more visually impaired users to detect one or more patterns of behavior.
Figure 6:
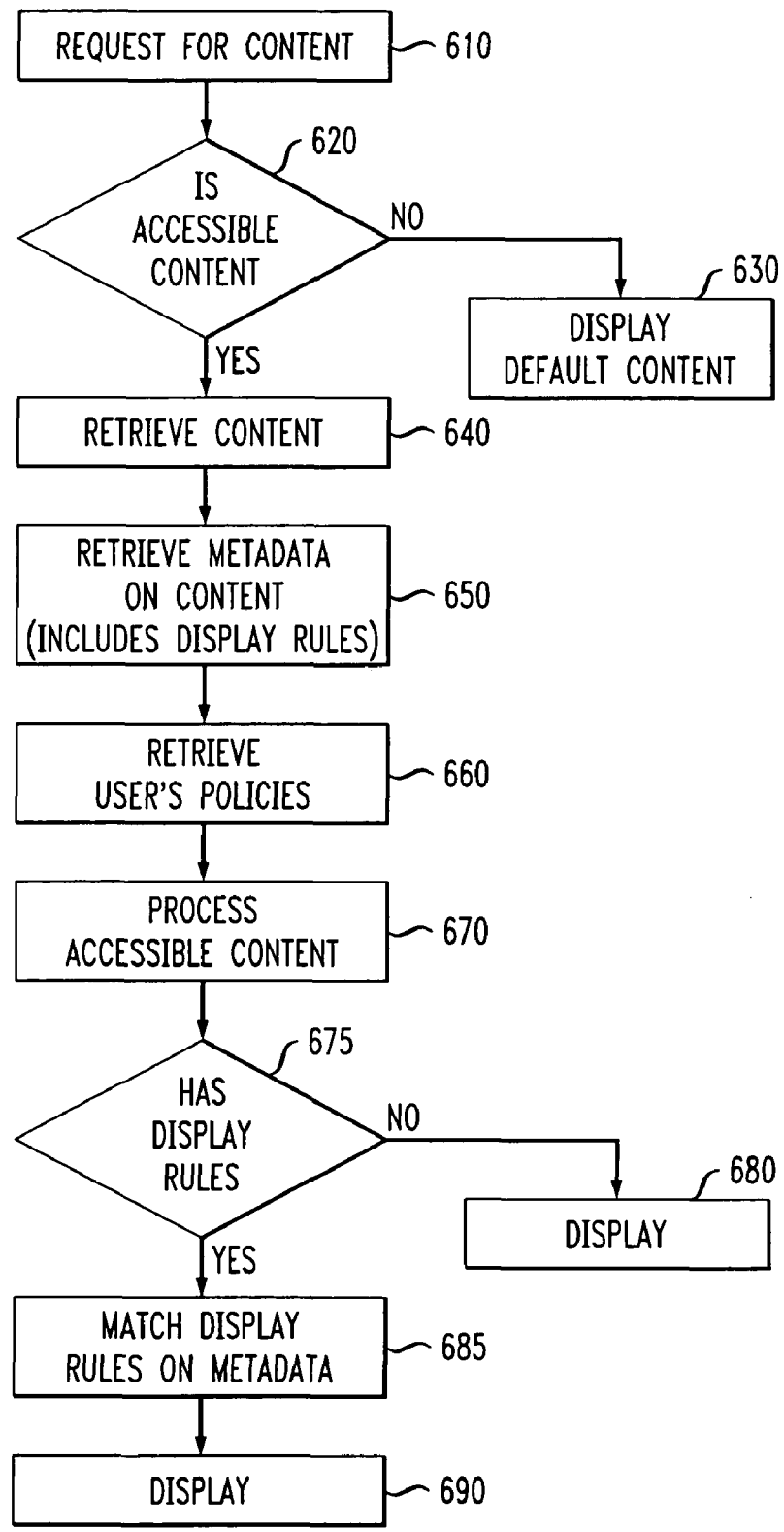
FIG. 6 is a flow chart describing an exemplary implementation of a presentation process that presents content to users based on the detected patterns of behavior.

FIG. 5 is a flow chart describing an exemplary implementation of a monitoring process 500 that observes the browsing experience of one or more visually impaired users to detect one or more patterns of behavior. In one exemplary embodiment, the monitoring process 500 collects data regarding the actions of a user in a non-intrusive manner.

Once the IAE 200 determines that a visually impaired user 105 is accessing the system, for example, based on a flag that has been set associated with the request 135, or based on a version identifier of the browser 120 that is included in the HTTP request 135, as indicated above, the IAE 200 can initiate the monitoring process 500 to observe the browsing experience of the user and thereafter detect patterns of behavior.

As shown in FIG. 5, when the monitoring process 500 is active, a user action detected during step 510 will trigger a behavior engine during step 520 to process the behavior. The behavior engine can be implemented as server-side logic, for example, in the IAE 200, that is transparent to the client, but is part of servicing a request for a web page. The behavior engine tracks these requests and formulates behavioral patterns for that user, such as the pages most viewed or skipped by the user, as well as the time, frequency and duration of each request.

A test is performed during step 530 to determine if the behavior observed during step 520 is a new behavior (i.e., not previously observed for this user). If it is determined during step 530 that the observed behavior is a new behavior, then the behavior is recorded during step 540 in a record associated the with this user. The user behavior can optionally be recorded with context information and metadata about the available content and the content the user is requesting. The recorded context information can identify the user, what they are currently doing, and what they have been doing since they started the current browsing session.

Thereafter, default rules are applied during step 550, whereby general statistics (obtained, for example, based on actions of a population or group associated with the user) are employed to determine what is relevant for the current user.

If, however, it is determined during step 530 that the observed behavior is not a new behavior, then a further test is performed during step 560 to determine if the observed behavior is part of a previously identified pattern of behavior. If it is determined during step 560 that the observed behavior is part of a behavior pattern, then the rules associated with the behavior pattern are applied during step 570. For example, if the user has previously visited the same web page and selected a particular link (or menu option) from a list of available links (or available menu options), the rule can require that the previously selected link is presented to the user at the top of the list of available links (if multiple links on the same page have been previously selected, the list of links can be presented, for example, based on the frequency or recency of selection).

If, however, it is determined during step 560 that the observed behavior is not part of a previously observed behavior pattern, then one or more rules are developed for the new behavior pattern during step 580. For example, the behavior engine can evaluate the context of the request, the behavior of the user, and the system metadata, to determine the most relevant content on the page, and an optimized web page flow for further links. Generally, the behavior engine attempts to rank available choices based on prior behavior of this user.

If an observed behavior pattern indicates, for example, that the user likes to check those people watching their presence (i.e., watches), and then listen to the buddy list (usually the buddy list is the first page after login), a rule would be generated to load the watchers page first for that user and then the buddy list. These two sets of information could also be dynamically combined on the same page, reducing the redundant page loading and re-listening to page information. The menu could be dynamically bound to a hotkey (keyboard stroke) via a voice command (e.g., setting context), and the menu ordered based on which pages the user frequents the most.

In addition, an observed behavior pattern can be time-based, such as "day of week" or "time of day" trends or habits. For example, a particular user may visit the extensions page 400 (FIG. 4) on Mondays, evaluate system status on Tuesdays, and generate reports on Wednesdays. Thus, the generated pattern rules should have time-based conditions that would trigger the appropriate action (e.g., if "day of week" is "Monday" then first load extensions page 400 (FIG. 4)).

In one implementation, the rules are manually generated, for example, using a generic rule engine. The rules can be in the form of triggers (or conditions) and corresponding actions to be performed. For example, a rule can trigger on some predefined user behavior, such as accessing a particular web page, web domain, web page type, or web page having predefined content, and the corresponding action can define how the content is presented to the user, such that the user is presented with the content that is most likely of interest.

Since the observed behavior is a new behavior pattern, a "best efforts" approach can be employed during step 590 to control the presentation of content. For example, the "best efforts" rule can present content based on one or more policies of an enterprise, based on predefined preferences of the specific user or based on the default rules applied during step 550.

FIG. 6 is a flow chart describing an exemplary implementation of a presentation process 600 that presents content to users based on the detected patterns of behavior. In this manner, web content can be presented to the visually impaired user using dynamic page restructuring based on the individual needs of a visually impaired user. The user can thus be presented with the content that is most likely of interest based on the observed patterns of behavior.

As shown in FIG. 6, the presentation process 600 is initiated during step 610 upon receiving a request for content. A test is performed during step 620 to determine if the requested content is accessible content. If it is determined during step 620 that the requested content is not accessible content, then the content is processed during step 630 in a conventional manner.

If, however, it is determined during step 620 that the requested content is accessible content, then the content is retrieved during step 640 and the metadata associated with the content is retrieved during step 650. The metadata associated with the content includes the display rules generated by the monitoring process 500. In addition, policies defined by the user are retrieved during step 660. The policies may include business rules that prioritize the actions of the user. For example, a user can specify a business rule indicating that alarms should be processed before handling administration changes. In addition, the policies can include preferences, such as a language preference, and whether a description of images included in the content should be presented. Generally, the explicit policy rules should have a higher priority than the content rules generated by the monitoring process 500 that were ascertained based on observed patterns of behavior.

The content is processed during step 670. A test is performed during step 675 to determine if there are any display rules (e.g., content rules generated by the monitoring process 500 and policies for the current user). If there are no display rules, then the content is presented during step 680.

If there are applicable display rules, then the display rules are applied to the metadata associated with the requested content during step 685 to dynamically restructure the requested page based on the individual needs of a visually impaired user. The restructured page is presented to the user during step 690.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method for processing one or more requests for content for a visually impaired user, comprising:
    observing behavior of said visually impaired user in connection with said requests; and
    when determining that said observed behavior constitutes a behavior pattern, generating one or more rules based on said observed behavior, wherein said rules dynamically restructure content presented on at least one web page such that previously selected portions of said content are presented to said visually impaired user prior to other portions of said content;
    wherein said observed behavior comprises at least one of pages viewed by the visually impaired user, pages skipped by the visually impaired user, a frequency of access to pages, and a duration of each page access.

2. The method of claim 1, further comprising determining that said user is a visually impaired user.

3. The method of claim 1, wherein said one or more rules are based on one or more of a context of said requests, said observed behavior of said visually impaired user, and system metadata.

4. The method of claim 3, wherein said context of said requests comprises one or more of an identity of said visually impaired user, what said visually impaired user is doing at a time of said request and what said visually impaired user has been doing since starting a current browsing session.

5. The method of claim 1, wherein said one or more generated rules specify a web page flow for further links.

6. The method of claim 1, wherein said one or more generated rules rank available content choices based on said observed behavior of said visually impaired user.

7. The method of claim 1, wherein each of said rules comprises at least one condition for triggering said rule and a corresponding action that defines how said content is presented to said visually impaired user.

8. An apparatus for processing one or more requests for content for a visually impaired user, the apparatus comprising:
    a memory that is non-transitory; and
    at least one processor, coupled to the memory, operative to:
    observe behavior of said visually impaired user in connection with said requests; and
    when determining that said observed behavior constitutes a behavior pattern, generate one or more rules based on said observed behavior, wherein said rules dynamically restructure content presented on at least one web page such that previously selected portions of said content are presented to said visually impaired user prior to other portions of said content;
    wherein said observed behavior comprises at least one of pages viewed by the visually impaired user, pages skipped by the visually impaired user, a frequency of access to pages, and a duration of each page access.

9. The apparatus of claim 8, wherein said one or more rules are based on one or more of a context of said requests, said behavior of said visually impaired user, and system metadata.

10. An article of manufacture for processing one or more requests for content for a visually impaired user, comprising:
    a non-transitory machine readable medium comprising one or more programs which when executed are operative to:
    observing behavior of said visually impaired user in connection with said requests; and
    when determining that said observed behavior constitutes a behavior pattern, generating one or more rules based on said observed behavior, wherein said rules dynamically restructure content presented on at least one web page such that previously selected portions of said content are presented to said visually impaired user prior to other portions of said content;
    wherein said observed behavior comprises at least one of pages viewed by the visually impaired user, pages skipped by the visually impaired user, a frequency of access to pages, and a duration of each page access.

11. A method for processing a request for content for a visually impaired user, comprising:
    identifying one or more rules associated with said visually impaired user that are applicable to said requested content, wherein said rules are based on previously observed behavior of said visually impaired user; and
    restructuring said requested content based on said one or more applicable rules such that previously selected portions of said content are presented to said visually impaired user prior to other portions of said content;

wherein said observed behavior comprises at least one of pages viewed by the visually impaired user, pages skipped by the visually impaired user, a frequency of access to pages, and a duration of each page access.

12. The method of claim 11, further comprising determining that said user is a visually impaired user.

13. The method of claim 11, wherein each of said rules comprises at least one condition for triggering said rule and a corresponding action that defines how said content is presented to said visually impaired user.

14. The method of claim 11, wherein said one or more rules rank available content choices based on said observed behavior of said visually impaired user.

15. The method of claim 11, wherein said one or more rules specify a web page flow for further links.

16. The method of claim 11, wherein said restructured content can be transformed into Voice XML and applied to an interactive voice response system.

17. An apparatus for processing a request for content for a visually impaired user, the apparatus comprising:
 a memory that is non-transitory; and
 at least one processor, coupled to the memory, operative to:
  identify one or more rules associated with said visually impaired user that are applicable to said requested content, wherein said rules are based on previously observed behavior of said visually impaired user; and
  restructure said requested content based on said one or more applicable rules such that previously selected portions of said content are presented to said visually impaired user prior to other portions of said content;
  wherein said observed behavior comprises at least one of pages viewed by the visually impaired user, pages skipped by the visually impaired user, a frequency of access to pages, and a duration of each page access.

18. The apparatus of claim 17, wherein each of said rules comprises at least one condition for triggering said rule and a corresponding action that defines how said content is presented to said visually impaired user.

19. An article of manufacture for processing a request for content for a visually impaired user, comprising:
 a non-transitory machine readable medium comprising one or more programs which when executed are operative to:
  identifying one or more rules associated with said visually impaired user that are applicable to said requested content, wherein said rules are based on previously observed behavior of said visually impaired user; and
  restructuring said requested content based on said one or more applicable rules such that previously selected portions of said content are presented to said visually impaired user prior to other portions of said content;
  wherein said observed behavior comprises at least one of pages viewed by the visually impaired user, pages skipped by the visually impaired user, a frequency of access to pages, and a duration of each page access.

20. A system, comprising:
 a client device for generating at least one request from a visually impaired user for content;
 at least one node in a network for routing said at least one request to a server that provides said content; and
 a server configured to:
  observe behavior of said visually impaired user in connection with said requests;
  when determining that said observed behavior constitutes a behavior pattern, generate one or more rules based on said observed behavior that dynamically restructure content presented on at least one web page such that previously selected portions of said content are presented to said visually impaired user prior to other portions of said content;
  wherein said observed behavior comprises at least one of pages viewed by the visually impaired user, pages skipped by the visually impaired user, a frequency of access to pages, and a duration of each page access.

21. A system, comprising:
 a client device for generating at least one request from a visually impaired user for content;
 at least one node in a network for routing said at least one request to a server that provides said content; and
 a server configured to:
  identify one or more rules associated with said visually impaired user that are applicable to said requested content, wherein said rules are based on previously observed behavior of said visually impaired user; and
  restructure said requested content based on said one or more applicable rules such that previously selected portions of said content are presented to said visually impaired user prior to other portions of said content;
  wherein said observed behavior comprises at least one of pages viewed by the visually impaired user, pages skipped by the visually impaired user, a frequency of access to pages, and a duration of each page access.

* * * * *